United States Patent [19]
Takane

[11] Patent Number: 4,764,864
[45] Date of Patent: Aug. 16, 1988

[54] CIRCUIT ARRANGEMENT CAPABLE OF IMPROVING OVERHEAD OF A CONTROL PROGRAM ON INTERRUPTING INTO A VIRTUAL MACHINE

[75] Inventor: Hisao Takane, Tokyo, Japan

[73] Assignee: NEC Corporation, Tokyo, Japan

[21] Appl. No.: 848,159

[22] Filed: Apr. 4, 1986

[30] Foreign Application Priority Data

Apr. 4, 1985 [JP] Japan .................. 60-69954
Apr. 23, 1985 [JP] Japan .................. 60-85332

[51] Int. Cl.$^4$ .............................................. G06F 9/46
[52] U.S. Cl. ................................................. 364/200
[58] Field of Search ... 364/200 MS File, 900 MS File

[56] References Cited

U.S. PATENT DOCUMENTS 4,400,769  8/1983  Kaneda et al. .................. 364/200
4,459,661  7/1984  Kaneda et al. .................. 364/200

OTHER PUBLICATIONS

IBM Systems Journal "Virtual Storage And Virtual Machine Concepts" pp. 99–130 of vol. Eleven, No. 2, 1972.

Primary Examiner—Eddie P. Chan
Attorney, Agent, or Firm—Foley & Lardner, Schwartz, Jeffery, Schwaab, Mack, Blumenthal & Evans

[57] ABSTRACT

In an arrangement for use in a virtual machine operable in accordance with a plurality of operating systems, hardware circuits, such as a judging circuit (36) and an interruption reception circuit (31), monitor reception of an interruption request and the accompanying interruption information. The interruption information is transferred from a first holding area (11) to a second one (12) under control of a control program when the interruption request can not be received by one of the operating systems in question. Transfer of the interruption information results in production of a pseudo interruption signal PI from a controller (22). When the one operating system can receive the pseudo interruption request, the judging circuit starts either the control program or an interruption processing program of the one operating system in consideration of internal states of the first and second holding areas.

2 Claims, 3 Drawing Sheets

CIRCUIT ARRANGEMENT CAPABLE OF IMPROVING OVERHEAD OF A CONTROL PROGRAM ON INTERRUPTING INTO A VIRTUAL MACHINE

BACKGROUND OF THE INVENTION

This invention relates to an interruption informing circuit arrangement for use in a virtual machine in informing an active operating system of a held interruption which is an interruption sent from an input/output (I/O) device and is held in the interruption informing circuit arrangement.

The virtual machine is operable as a plurality of operating systems which are controlled by a control program. The operating systems include interruption processing programs, respectively.

In such a virtual machine, a particular processing must be carried out when an interruption request is sent from the I/O device. For example, an interruption request which is received during operation of a particular one of the operating systems may be directed to another of the operating systems that should be interrupted. Therefore, any interruption request must access the control program in order that the control program can judge which one of the operating systems should be interrupted by the interruption request as a judged operating system and that the control program can start the interruption processing program of the judged operating system. The judged operating system may, however, not be able to receive the interruption request at this time.

In such a case, the control program of a conventional virtual machine informs the judged operating system of the fact that the interruption request is pending. The control program is started when the interruption request can be received during operation of the judged operating system. Such a method is disclosed in an article contributed by R. P. Parmelee et al to IBM Systems Journal, Volume 11 (1972), No. 2, pages 99 to 131, under the title of "Virtual storage and virtual machine concepts."

However, this method is disadvantageous in that the overhead of processing by the control program increases because the control program waits to process the interruption request until the interruption request can be received.

SUMMARY OF THE INVENTION

It is an object of this invention to provide an interruption informing circuit arrangement which is capable of eliminating much of the overhead of processing by the control program.

An interruption informing circuit arrangement to which this invention is applicable, is for use in informing a virtual machine of an interruption request and interruption information accompanied by the interruption request wherein the virtual machine is operable in accordance with a plurality of operating systems which include interruption processing programs, respectively, and which are controlled by a control program to be selectively operable as an active generating system one at a time. According to the invention, the interruption informing circuit arrangement comprises first interruption holding means for holding the interruption information, the interruption information specifying a particular operating system, overall judging means for judging whether or not the interruption request can be received by the active operating system, first judging means operatively coupled to the overall judging means and coupled for receiving the interruption information held in the first interruption holding means for judging under control of the control program that said particular operating system should be interrupted as a judged operating system by the interruption request and second judging means coupled to the first judging means for judging under control of the control program whether or not the interruption request can be received by the judged operating system. The interruption informing circuit also includes first starting means coupled to the second judging means for starting the interruption processing program of the judged operating system under control of the control program when the interruption request can be received by the judged operating system, second interruption holding means coupled to the second judging means for holding under control of the control program the interruption information held in the first interruption holding means when the interruption request can not be received by the judged operating system said second interruption holding means receiving said interruption information from said first judging means, and second starting means coupled to the second judging means for starting the judged operating system when the interruption request can not be received by the judged operating system so that said judged operating system may ultimately receive the interruption request. Thus, the second starting means produces a pseudo interruption request under control of the control program. The invention further includes third judging means coupled to the second starting means for judging whether or not the pseudo interruption request can be received by the judged operating system, and third starting means coupled to the first and the second interruption holding means and to the third judging means for restarting the control program when the interruption information is held in the first interruption holding means and furthermore when the pseudo interruption request can be received by the judged operating system, the third starting means starting the interruption processing program of the judged operating system when the interruption information is not held in the first interruption holding means but in the second interruption holding means and furthermore when the pseudo interruption request can be received by the judged operating system.

DESCRIPTION OF THE PREFERRED EMBODIMENT

Figure 1:
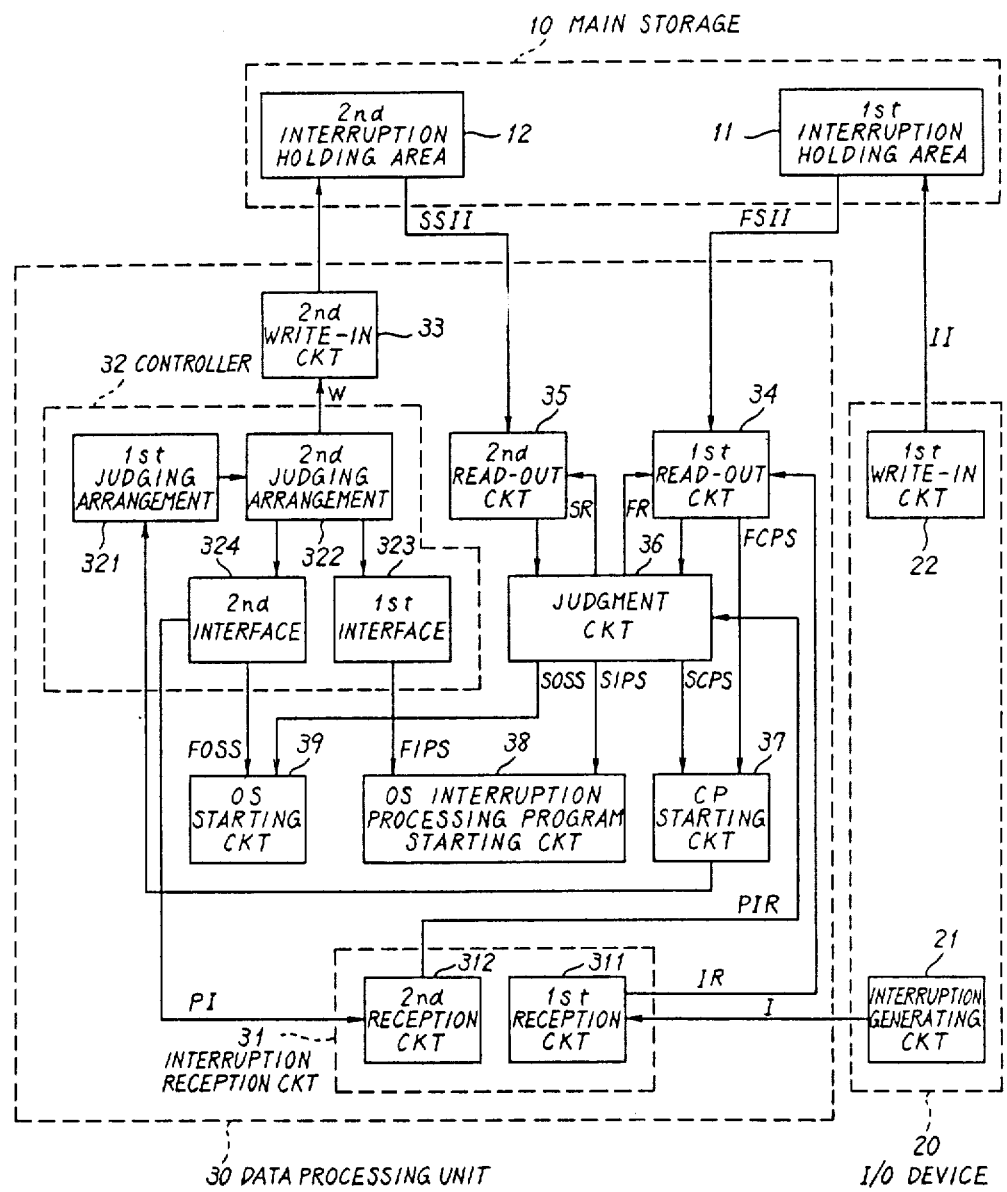
FIG. 1 is a block diagram of a virtual machine which includes an interruption informing circuit arrangement according to an embodiment of the instant invention.

Referring to FIG. 1, a virtual machine includes an interruption informing circuit arrangement according to an embodiment of this invention. The virtual machine is operable in accordance with a plurality of operating systems which are controlled by a control program. The operating systems, as herein called, are software and include interruption processing programs, respectively. Each operating system controls a computing system which comprises a main storage 10, an I/O device 20, and a data processing unit 30.

Controlled by the control program, the operating systems are selectively put into an active state. One of the operating systems that is put into the active state, will be called an active operating system.

The main storage 10 includes first and second interruption holding areas 11 and 12. Each of the first and the second interruption holding areas 11 and 12 is for holding interruption information II in the manner which will later be described.

The I/O device 20 includes an interruption generating circuit 21 which generates an interruption request I related to the interruption information II. A first write-in circuit 22 is for writing interruption information II in the first interruption holding area 11. The relationship between the interruption request I and the interruption information II will become clear as the description proceeds. It may be mentioned here that the interruption information II precedes the interruption request I and that both of the interruption request I and the interruption information II are produced in response to an I/O request.

The data processing unit 30 includes an interruption reception circuit 31 coupled to the interruption generating circuit 21. The interruption reception circuit 31 comprises a first reception circuit 311 which receives the interruption request I. A second reception circuit 312 receives a pseudo interruption request PI which will later be described in detail.

The first reception circuit 311 acts as an overall judging arrangement for judging whether or not the interruption request I can be received by the active operating system. An interruption reception signal IR is produced by the first reception circuit 311 when the active operating system can receive the interruption request I. The second reception circuit 312 is operable in response to the pseudo interruption request PI. For the time being, it may be understood that the second reception circuit 312 determines whether or not the pseudo interruption request PI can be received by a judged operating system which is indicated in a manner to be described later. The second reception circuit 312 produces a pseudo interruption reception signal PIR when reception of the pseudo interruption request PI is possible by the judged operating system.

In the manner which will later become clear in conjunction with operation of the interruption informing circuit arrangement, it is not always possible to interrupt the operating systems. Only when each active operating system can receive the interruption request I, that operating system produces an interruption possible signal in the manner known in the art. It will therefore readily be possible to make each active operating system produce the interruption possible signal of this type when that operating system can receive the pseudo interruption request PI. Activated by the interruption request, I, the first reception circuit 311 monitors the operating systems to produce the interruption reception signal IR upon detection of the information possible signal. Supplied with the pseudo interruption request PI, the second reception circuit 312 produces the pseudo interruption reception signal PIR. Such reception circuits 311 and 312 are readily implemented by hardware.

A controller 32 is operatively coupled to the second reception circuit 312 and operable under control of the control program. More particularly, the controller 32 comprises a first judging arrangement 321 for judging which one of the operating systems should be interrupted by the interruption request I. More particularly, the first judging arrangement 321 is operatively coupled to the first interruption holding area 11 in a manner to be described later and is supplied as first stored interruption information FSII with the interruption information II held in the first interruption holding area 11. At any rate, the first judging arrangement 321 determines under control of the control program the judged operating system with reference to the first stored interruption information FSII. The judged operating system is representative of one of the operating systems that is to be interrupted in response to the first stored interruption information FSII and that may be executed in the following procedure. In practice, the first judging arrangement 321 is implemented by the control program.

The controller 32 further comprises a second judging arrangement 322 which is coupled to the first judging arrangement 321 and which, in practice, is again implemented by the control program. The second judging arrangement 322 is supplied with a result signal representative of the judged operating system to judge under control of the control program whether or not the judged operating system can receive the interruption request I.

When the judged operating system can receive the interruption request I, the second judging arrangement 322 produces a first interruption processing start control signal FIPS through a first interface 323. The first interruption processing start control signal FIPS is indicative of commencement of interruption processing.

When the judged operating system can not receive the interruption request I, the second judging arrangement 322 produces the pseudo interruption request PI and a first operating system start control signal FOSS through a second interface 324. The first operating system start control signal FOSS is indicative of start of the judged operating system. The pseudo interruption request PI specifies the judged operating system and is internally produced in the data processing unit 30 to be processed in a manner similar to the interruption request I externally given from the I/O device 20. In addition, the second judging arrangement 322 delivers a write-in control signal W to a second write-in circuit 33 when the judged operating system can not receive the interruption request I. The write-in control signal W includes the first stored interruption information FSII sent from the first interruption holding area 11.

The second write-in circuit 33 writes the first stored interruption information FSII in the second interruption holding area 12 as interruption information in response to the write-in control signal W.

A first read-out circuit 34 reads the first stored interruption information FSII out of the first interruption holding area 11 in response to the interruption reception signal IR. In this event, the first read-out circuit 34 produces a first control program start control signal FCPS which includes the first stored interruption information FSII. The first read-out circuit 34 is also operable in response to a first read-out control signal FR as will become clear as the description proceeds.

A second read-out circuit 35 reads the interruption information from the second interruption holding area 12 as a second stored interruption information SSII in response to a second read-out control signal SR, as will later be described in detail.

Responsive to the pseudo interruption reception signal PIR, a judgment circuit 36 produces one of a second operating system start control signal SOSS, a second interruption processing start control signal SIPS, and a second control program start control signal SCPS in the manner to be described in detail. It is to be noted that the judgment circuit 36 is a hardware circuit. The second control program start control signal SCPS includes the first stored interruption information FSII. More specifically, the judgment circuit 36 generates the first and second read-out control signals FR and SR in response to the pseudo interruption reception signal PIR. The first and the second read-out control signals FR and SR are for checking contents of the first and the second interruption holding areas 11 and 12, respectively. The judgment circuit 36 produces the second control program start control signal SCPS when the interruption information II is set in the first interruption holding area 11. The judgment circuit 36 produces the second interruption processing start control signal SIPS when the interruption information is not set in the first interruption holding area 11 but in the second interruption holding area 12. The judgment circuit 36 also produces the second operating system start control signal SOSS when the interruption information is set in neither the first interruption holding area 11 nor the second interruption holding area 12.

A control program starting circuit 37 is coupled to the first read-out circuit 34 and the judgment circuit 36 to start the control program in response to either the first control program start control signal FCPS or the second control program start control signal SCPS and to inform the first judging arrangement 321 of the first stored interruption information FSII.

It is now understood that the first judging arrangement 321 is coupled to the first reception circuit 311 through the first read-out circuit 34 and the control program starting circuit 37 and judges under control of the control program which one of the plurality of operating systems should be interrupted as a judged operating system by the interruption request I.

An operating system interruption processing program starting circuit 38 starts the interruption processing program of the judged operating system in response to either the first interruption processing start control signal FIPS or the second interruption processing start control signal SIPS. Thus, the above-mentioned starting circuit 38 is coupled to the second judging arrangement 322.

In the manner described before, the second judging arrangement 322 produces the first interruption processing start control signal FIPS through the first interface 323 when the judged operating system can receive the interruption request I. A combination of the first interface 323 and the operating system interruption program starting circuit 38 therefore serves as a first starting arrangement coupled to the second judging arrangement 322 to start the interruption processing program of the judged operating system when the interruption request I can be received by the judged operating system.

An operating system starting circuit 39 starts the judged operating system in response to either the first operating system start control signal FOSS or the second operating system start control signal SOSS.

In the manner described above, the second judging arrangement 322 produces the first operating system start control signal FOSS through the second interface 324 when the judged operating system can not receive the interruption request I. A combination of the second interface 324 and the operating system starting circuit 39 therefore serves as a second starting arrangement coupled to the second judging arrangement 322 to start the judged operating system when the interruption request I can not be received by the judged operating system. It has already been described that the second interface 324 of the second starting arrangement produces the pseudo interruption request PI at this instant.

The second reception circuit 312 is coupled to the second interface 324 of the second starting arrangement and acts as a third judging arrangement which is, as described before, for judging whether or not the pseudo interruption request PI can be received by the judged operating system. The judgment circuit 36 serves as a third starting arrangement coupled to the first and second interruption holding areas 11 and 12 through the first and second read-out circuits 34 and 35 and to the third judging arrangement 312. This is because the judgment circuit 36 starts the control program starting circuit 37 by the second control program start control signal SPCS when the interruption information II is held in the first interruption holding area 11 and furthermore when the pseudo interruption reception signal PIR indicates that the pseudo interruption request PI can be received by the judged operating system. The third starting arrangement starts the interruption processing program of the judged operating system by the second interruption processing start control signal SIPS when the interruption information II is not held in the first interruption holding area 11 but in the second interruption holding area 12 and furthermore when the pseudo interruption reception signal PIR indicates that the pseudo interruption request PI can be received by the judged operating system.

It is possible to understand that the control program starting circuit 37 is a block representation of the operation of the first and second control program start control signals FCPS and SCPS. More specifically, the first part 321 of the control program is put into operation like by the interruption request I in a conventional virtual machine and is notified of the interruption information II read out of the first interruption holding area 11. Similarly, the operating system interruption processing program starting and the operating system starting circuits 38 and 39 are block representations operable on the operating system.

Figure 2A:
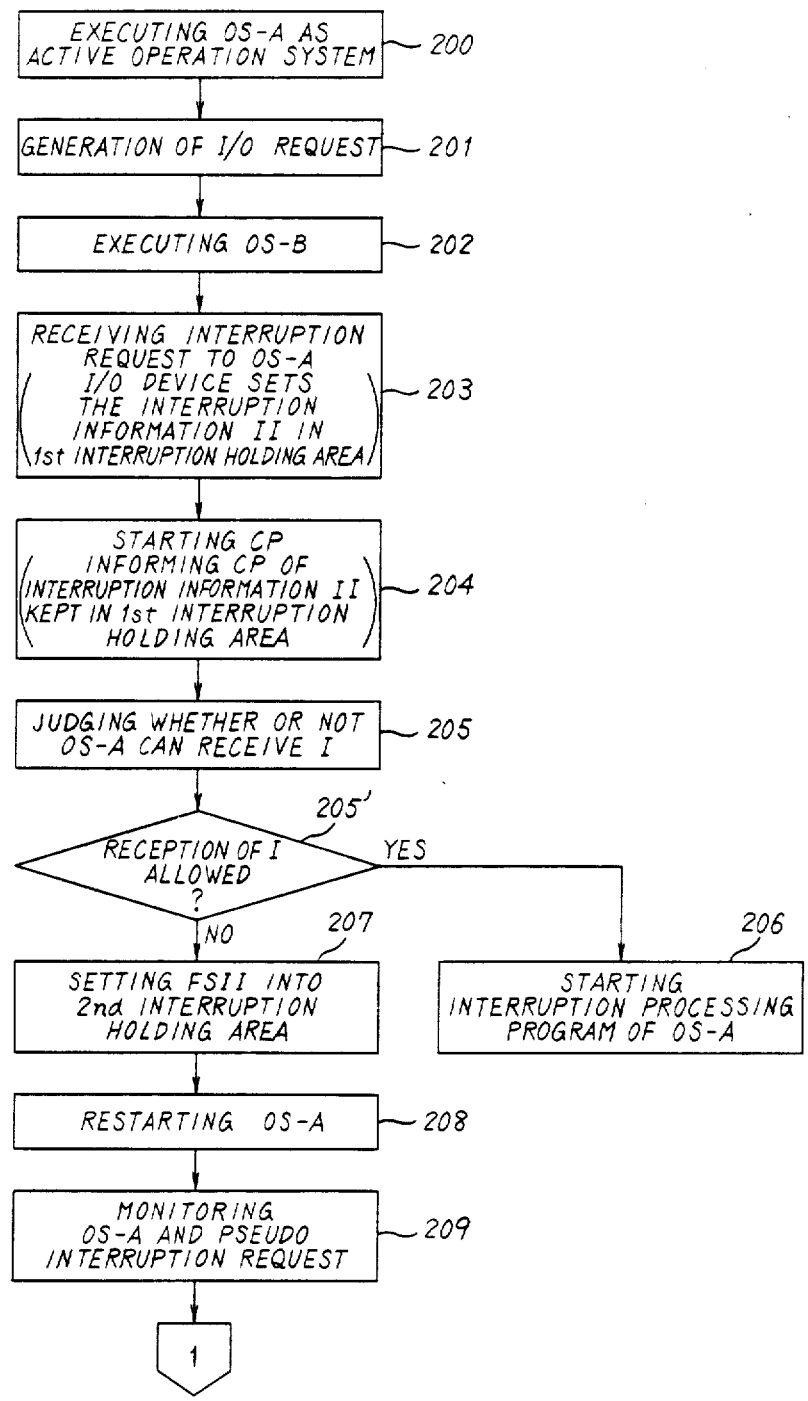
FIGS. 2(a) and (b) collectively show a flow chart for use in describing operation of the interruption informing circuit arrangement illustrated in FIG. 1.
Figure 2B:
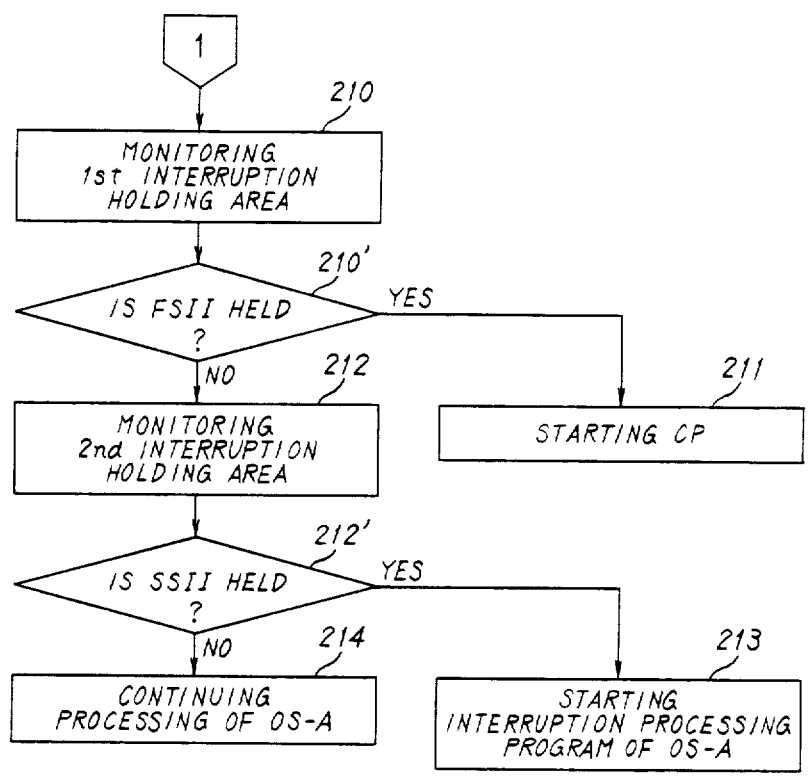

Operation of the interruption informing circuit arrangement of FIG. 1 will be described below with reference to FIGS. 2(a) and (b).

The active operation system will be called an operating system A (OS-A) (step 200).

In the meanwhile, the operating system A is assumed to generate an I/O request to the illustrated I/O device 20 (step 201). In this event, the operating system A may be stopped until an interruption request I and the accompanying interruption information II are sent from the I/O device 20 in question. Execution of the operating system A is therefore stopped until reception of the interruption request I. This means that the operating system A is no more the active operating system. Under the circumstances, a different operating system becomes the active operating system after generation of the I/O request. The different operating system will be named an operating system B and is executed by the data processing unit 30 (step 202).

The step 202 proceeds to a step 203 at which the interruption request I is delivered from the interruption generating circuit 21 of the I/O device 20 to the first reception circuit 311 in response to the above-mentioned I/O request. Let the interruption request I be addressed to the operating system A. As a result, the operating system B which is being executed is stopped by the data processing unit 30.

Under the circumstances, reception of the interruption request I becomes allowable by the first reception circuit 311. In addition, the interruption information II is sent from the first write-in circuit 22 and set in the first interruption holding circuit 11, as shown at the step 203 in FIG. 2(a). In the example being illustrated, the interruption request I is received by the first reception circuit 311 as soon as the first write-in circuit 22 sets the interruption information II in the first interruption holding area 11. Thus, the interruption request I is received and controlled by hardware, such as the first reception circuit 311.

It may be mentioned here that each operating system comprises a sequence of instructions. A part of the instruction sequence may specify prohibition of the interruption. Prohibition of the interruption is called an interruption mask function in the art. Therefore, reception of the interruption request I is not always allowable by the operating system B. Taking this into consideration, the first reception circuit 311 always monitors a running one of the operating systems and the interruption request I and judges whether or not the interruption request I can be received by the operating system B at the step 203. Thus, the running operating system is always monitored by the use of a hardware circuit, such as the first reception circuit 311.

The control program which is stored in a control memory (not shown) of the controller 32 is started to access the operating system in question in response to the interruption request I. More particularly, when reception of the interruption request I is possible by the operating system B, the interruption reception signal IR is produced from the first reception circuit 311 and enables the first read-out circuit 34. At the same time, the operating system B is stopped by the data processing unit 30. The first stored interruption information FSII is read out of the first interruption holding area 11 and sent through the first read-out circuit 34 as the first control program start control signal FCPS to the control program starting circuit 37. Responsive to the above-mentioned signal FCPS, the control program starting circuit 37 supplies the first judging arrangement 321 with the first stored interruption information FSII and starts the control program, as shown at the step 204. The first judging arrangement 321 determines the judged operating system in response to the first stored interruption information FSII. In the example being illustrated, the operating system A is determined as the judged operating system.

The second judging arrangement 322 is operated at the steps 205 and 205' to judge whether or not the judged operating system A allows reception of the interruption request I. As mentioned above, the interruption request I is not always allowed to be received by the judged operating system A. Accordingly, the second judgment arrangement 322, which may be also considered as a part of the control program, judges whether or not the interruption request I can be received by the judged operating system A at the step 205 and the following step 205'.

If reception of the interruption request I is allowable by the operating system A, the step 205' is followed by a step 206 at which the control program starts the interruption processing program of the judged operating system A. The interruption processing program of the judged operating system A processes the interruption request I received at the step 203. In this event, the second judging arrangement 322 produces the first interruption processing start control signal FIPS through the first interface 323. The operating system interruption processing program starting circuit 38 starts the interruption processing program of the operating system A in response to the first interruption processing start control signal FIPS.

If the reception of the interruption request I is not allowed at the step 205', a step 207 follows the step 205'. At the step 207, the first stored interruption information FSII is set through the second write-in circuit 33 into the second interruption holding area 12 of the main storage 10 as the second stored interruption information SSII. The second interruption holding area 12 holds the interruption information until reception of the interruption request I becomes possible by the operating system A. Specifically, the second judging arrangement 322 produces the write-in control signal W when the interruption request I is prohibited by the instructions of the judged operating system A which is being stopped. Responsive to the write-in control signal W, the second write-in circuit 33 writes the first stored interruption information FSII in the second interruption holding area 12 at the step 207.

Subsequently, the step 207 is followed by a step 208 at which the judged operating system A is restarted by the controller 32 under control of the control program. At this time, the data processing unit 30 is put in a state like external reception of the interruption request I given from the I/O device 20. More particularly, the second judging arrangement 322 delivers at the step 208 the first operating system start control signal FOSS and the pseudo interruption request PI to the operating system starting circuit 39 and the second reception circuit 312, respectively, through the second interface 324. The operating system starting circuit 39 starts the judged operating system A in response to the first operating system start control signal FOSS.

At a step 209, the second reception circuit 312 of the interruption reception circuit 31 continuously monitors whether or not reception of the pseudo interruption request PI becomes allowable by the operating system A. When reception of the pseudo interruption request PI becomes possible during the operation of the operating system A, the pseudo interruption request PI is received by the operating system A so as to carry out the interruption processing program of the operating system A. At this time, the second reception circuit 312 sends the pseudo interruption reception signal PIR to the judgment circuit 36.

The step 209 proceeds to steps 210 and 210' at which the judgment circuit 36 monitors the interruption information II and determines whether or not the interruption information II is set in the first interruption holding area 11 in a manner to be presently described. This monitoring operation is carried out with a view to investigating whether or not a next following interruption request is received after the interruption request I in question is received at the step 203. For this purpose, the judgment circuit 36 generates the first read-out control signal FR in response to the pseudo interruption reception signal PIR. The first read-out circuit 34 reads the contents of the first interruption holding area 11 in response to the first read-out control signal FR and transfers the contents to the judgment circuit 36. The judgment circuit 36 judges whether or not the first interruption holding area 11 is loaded with new interruption information accompanying the next following interruption request. Thus, the contents of the first interruption holding area 11 is monitored by hardware, such as the first read-out circuit 34 and the judgment circuit 36.

If the new interruption information is stored in the first interruption holding circuit 11, the step 210 is succeeded by a step 211 for starting the control program. To this end, the judgment circuit 36 delivers the second control program start control signal SCPS to the control program starting circuit 37. As a result, the control program is started in the controller 32 so as to process the new interruption information stored in the first interruption holding area 11. Thus, the control program is driven by the first read-out circuit 34, the judgment circuit 36, and the control program starting circuit 37, which are all hardware.

If no new interruption information is held in the first interruption holding area 11, the step 210' is followed by a step 212 for monitoring the second interruption holding area 12.

At a step 212' succeeding the step 212, the judgment circuit 36 judges whether or not the second interruption holding area 12 is loaded with the second stored interruption information SSII. The second interruption holding area 12 is thus monitored through the second read-out circuit 35 by the judgment circuit 36.

If the second stored interruption information SSII is present in the second interruption holding area 12, the step 212' proceeds to a step 213 at which the interruption processing program of the operating system A is started by the judgment circuit 36 by sending the second interruption processing program start control signal SIPS to the operating system interruption processing program starting circuit 38. Consequently, the interruption processing program of the operating system A is started under control of the judgment circuit 36.

If no second stored interruption information SSIS is present in the second interruption holding area 12, a step 214 is carried out after the step 212' so as to continue processing of the operating system A. More specifically, the judgment circuit 36 produces the second operating system start control signal SOSS if the second stored interruption information is not set in the second interruption holding area 12. The operating system starting circuit 39 starts the operating system A in response to the second operating system start control signal SOSS.

While this invention has so far been described in conjunction with the embodiment thereof, it will readily be possible for those skilled in the art to put this invention into practice in other manners. For example, the interruption reception signal IR may be directly supplied to the judgment circuit 36 to start the control program at the step 204 by monitoring the first interruption holding circuit 11. In addition, the number of the operating systems may be greater in number than two.

What is claimed is:

1. An interruption informing circuit arrangement for use in informing a virtual machine of an interruption request and interruption information accompanied by said interruption request, said virtual machine being operable in accordance with a plurality of operating systems which include interruption processing programs, respectively, and which are controlled by a control program to be selectively operable as an active operating system one at a time, said circuit arrangement comprising:

first interruption holding means for holding said interruption information, said interruption information specifying a particular operating system;

overall judging means for judging whether or not said interruption request can be received by said active operating system;

first judging means operatively coupled to said overall judging means and coupled for receiving the interruption information held in said first interruption holding means for judging under control of said control program that said particular operating system should be interrupted as a judged operating system by said interruption request;

second judging means coupled to said first judging means for judging under control of said control program whether or not said interruption request can be received by said judged operating system;

first starting means coupled to said second judging means for starting the interruption processing program of said judged operating system under control of said control program when said interruption request can be received by said judged operating system;

second interruption holding means coupled to said second judging means for holding under control of said control program the interruption information held in said first interruption holding means when said interruption request can not be received by said judged operating system said second interruption holding means receiving said interruption information from said first judging means;

second starting means coupled to said second judging means for restarting said judged operating system when said interruption request can not be received by said judged operating system so that said judged operating system may ultimately receive said interruption request, said second starting means producing a pseudo interruption request under control of said control program;

third judging means coupled to said second starting means for judging whether or not said pseudo interruption request can be received by said judged operating system; and third starting means coupled to said first and said second interruption holding means and to said third judging means for restarting said control program: (1) when said interruption information is held in said first interruption holding means, and furthermore, (2) when said pseudo interruption request can be received by said judged operating system, said third starting means starting the interruption processing program of said judged operating system when said interruption information is not held in said first interruption holding means but in said second interruption holding means and furthermore when said pseudo interruption request can be received by said judged operating system.

2. A method of informing a virtual machine of an interruption request and interruption information accompanied by said interruption request, said virtual machine being operable as a plurality of operating systems which include interruption processing programs, respectively, and which are controlled by a control program to be selectively operable as an active operating system one at a time, said method comprising the steps of:

holding said interruption information, said interruption information specifying a particular operating system;

judging whether or not said interruption request can be received by said active operating system;

judging, under control of said control program, that said particular operating system should be interrupted as a judged operating system by said interruption request in response to the interruption information held during said holding step;

judging, under control of said control program, whether or not said interruption request can be received by said judged operating system;

starting the interruption processing program of said judged operating system under control of said control program when said interruption request can be received by said judged operating system;

storing under control of said control program the interruption information held during said holding step when said interruption request can not be received by said judged operating system;

starting said judged operating system under control of said control program when said interruption request can not be received by said judged operating system, so that said judged operating system may ultimately receive said interruption request;

producing a pseudo interruption request under control of said control program when said interruption request can not be received by said judged operating system;

judging whether or not said pseudo interruption request can be received by said judged operating system;

restarting said control program: (1) when said interruption information is held during said holding step, and furthermore, (2) when said pseudo interruption request can be received by said judged operating system; and starting the interruption processing program of said judged operating system when said interruption information is not held during said holding step but during said storing step and furthermore when said pseudo interruption request can be received by said judged operating system.

* * * * *